United States Patent
Reinhardt et al.

(10) Patent No.: US 7,587,663 B2
(45) Date of Patent: Sep. 8, 2009

(54) FAULT DETECTION USING REDUNDANT VIRTUAL MACHINES

(75) Inventors: Steven K. Reinhardt, Ann Arbor, MI (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 11/439,485

(22) Filed: May 22, 2006

(65) Prior Publication Data

US 2007/0283195 A1 Dec. 6, 2007

(51) Int. Cl.
*G06F 11/14* (2006.01)

(52) U.S. Cl. .................................. 714/819; 714/822

(58) Field of Classification Search ............... 714/819, 714/822
See application file for complete search history.

(56) References Cited

U.S. PATENT DOCUMENTS

| | | | |
|---|---|---|---|
| 3,944,800 A * | 3/1976 | Beck et al. ................. | 714/820 |
| 5,437,033 A | 7/1995 | Inoue | |
| 5,802,266 A | 9/1998 | Kanekawa et al. | |
| 5,905,855 A | 5/1999 | Klaiber | |
| 5,918,057 A | 6/1999 | Chou | |
| 6,092,217 A | 7/2000 | Kanekawa et al. | |
| 6,122,716 A * | 9/2000 | Combs ....................... | 711/163 |
| 6,513,131 B1 | 1/2003 | Kanekawa et al. | |
| 6,735,760 B1 * | 5/2004 | Dice .......................... | 717/139 |
| 6,839,968 B2 * | 1/2005 | Brown et al. ............... | 30/50 |
| 7,093,157 B2 * | 8/2006 | Hajji .......................... | 714/5 |
| 7,203,732 B2 * | 4/2007 | McCabe et al. ............. | 709/217 |
| 2005/0120144 A1 * | 6/2005 | Koyama ...................... | 710/8 |
| 2006/0045130 A1 * | 3/2006 | Kim et al. ................... | 370/469 |

FOREIGN PATENT DOCUMENTS

WO PCTUS2006048555 12/2006

* cited by examiner

*Primary Examiner*—Stephen M Baker
(74) *Attorney, Agent, or Firm*—Thomas R. Lane

(57) ABSTRACT

A technique to detect errors in a computer system. More particularly, at least one embodiment of the invention relates to using redundant virtual machines and comparison logic to detect errors occurring in input/output (I/O) operations in a computer system.

30 Claims, 4 Drawing Sheets

FAULT DETECTION USING REDUNDANT VIRTUAL MACHINES

BACKGROUND

1. Field

The present disclosure pertains to the field of computing and computer systems, and, more specifically, to the field of error detection in computer systems using virtual machine monitors.

2. Background

Some computer systems may be susceptible to processing errors during operation. For example, transient errors ("soft errors") caused by exposure of a computer system to radiation or other electromagnetic fields may corrupt data being transmitted throughout the computer system, causing incorrect or undesirable computing results. For example, soft errors may result in incorrect data being passed between a software application running on a processor and the input/output (I/O) data stream generated by the software application within a computer system. In this example, soft errors may exist in the application software, the operating system, the system software, or the I/O data itself.

The problem of soft errors in computer systems has been addressed through techniques, such as redundant software execution, wherein a segment of software is processed two or more times, sometimes on different processing hardware, in order to produce a number of results that can be compared with each other to detect an error in the result. Redundant software processing, although somewhat effective at detecting soft errors in a computer system, can require extra computing resources, such as redundant hardware, to redundantly process the software.

Another technique used in some computer systems is to virtualize the hardware in software and redundantly process various code segments within redundant virtual versions of the hardware in order to detect soft errors. Redundant virtual hardware, or redundant "virtual machines" (RVMs), can provide a software representation of underlying processing hardware, such that software code can be redundantly processed on the RVMs in parallel.

FIG. 1 illustrates a redundant virtual machine environment, in which software segments, such as software threads, can be processed redundantly in order to detect soft errors in the software. In particular, FIG. 1 illustrates two virtual machines (VMs) representing the same processing hardware in which a software thread can be processed redundantly and in parallel. The results from the redundant copies of one or more operations in the software thread can be compared with each other in order to detect a soft error before or after the software thread has actually been committed to hardware context state.

However, in order to assure that software is being processed equivalently on both VMs, the execution path of the code through the VMs must be controlled (or managed) by a software module, such as the replication management layer (RML), to be the same. Furthermore, the RML may need to compare the outputs of the two VMs. Unfortunately, the RML, or equivalent software modules, can introduce additional processing overhead that can cause performance degradation in a computer system. Furthermore, the RML may itself contain soft errors and therefore be unreliable.

BRIEF DESCRIPTION OF THE FIGURES

The present invention is illustrated by way of example and not limitation in the accompanying figures.

DETAILED DESCRIPTION

Embodiments of the invention relate to computer systems. More particularly, at least one embodiment of the invention relates to a technique to detect and respond to errors corresponding to input/output (I/O) operations within a computer system.

At least one embodiment of the invention uses hardware logic to perform a portion of the functions associated with detecting soft errors using redundant virtual machines (RVMs). More particularly, one or more embodiments of the invention uses a pair of designated storage areas along with corresponding input replication and output comparison logic to detect soft errors associated with a transfer of I/O data between one or more processors and one or more I/O devices.

In one embodiment, the designated storage areas include two or more register sets within or otherwise associated with an I/O controller to store data communicated between two or more virtual machines and an I/O device. In one embodiment, the designated storage areas may also include two or more segments of memory (e.g., VM buffers) to store data associated with a direct memory access (DMA) operation between memory and an I/O device.

Embodiments of the invention may incorporate logic either within or otherwise associated with an I/O controller device to perform various functions performed by the RML of the prior art. For example, in one embodiment, logic within an I/O controller associated with two or more RVMs representing processing hardware resources may be used to replicate the inputs provided by the I/O device to the RVMs and to compare the outputs generated by the RVMs in order to determine whether a soft error has occurred. Advantageously, embodiments including input replication and/or output comparison functionality in hardware logic can improve processing throughput, reduces software overhead, and reduces opportunities for soft errors to affect the soft error detection process.

Figure 1:
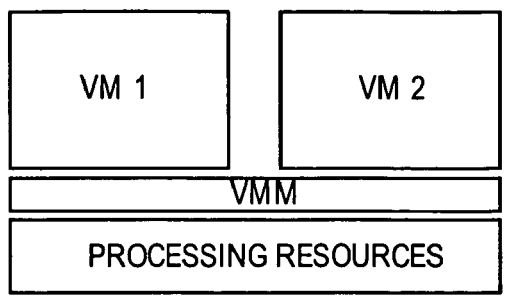
FIG. 1 illustrates a prior art redundant virtual machine (RVM) environment.
Figure 2:
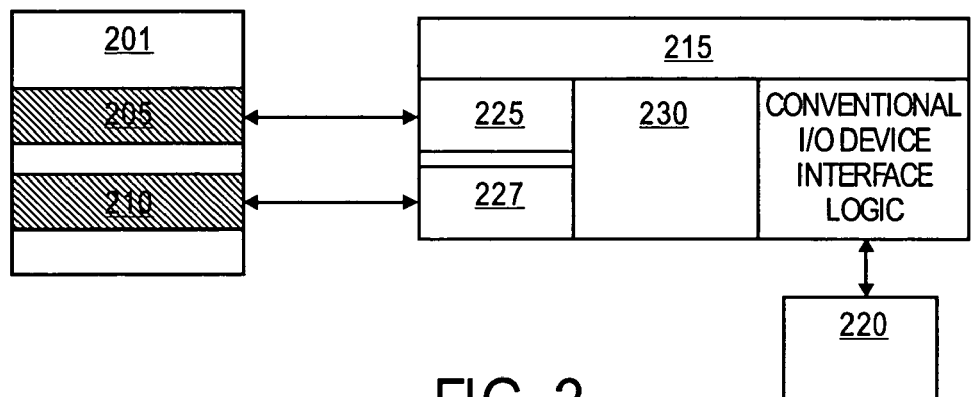
FIG. 2 illustrates components of a computer system that may be used in conjunction with one or more embodiments of the invention.

FIG. 2 illustrates components of a computer system, in which one embodiment of the invention may be implemented. In particular, FIG. 2 illustrates a CPU 201 including two RVMs 205, 210 to represent various processing resources of the CPU. Furthermore, FIG. 2 includes an I/O controller including I/O controller 215 to interface data between the CPU (and the RVMs) and one or more I/O devices 220. Further included in FIG. 2 are two representations 225, 227 of at least some of the control registers associated with the I/O controller. In one embodiment, the two representations each correspond to a different RVM are used to store control information used by the RVMs to send or receive data to/from the I/O controller. In one embodiment, the two representations are registers within or otherwise associated with the I/O controller, whereas in other embodiments, the representations are locations within a memory structure, such as DRAM.

Also located within the I/O controller of FIG. 2 is input replication and output comparison logic 230 to generate the control interface information corresponding to the I/O controller and compare the outputs of the RVMs and the corresponding outputs of the RVMs produced in response to the RVMs performing the tasks associated with the inputs. For example, in one embodiment, for a given software operation to be performed by the RVMs, the control interface information corresponding to the I/O controller may be stored in register sets within or otherwise associated with the I/O controller and output data of the RVMs may be compared to each other by the comparison logic to ensure that no soft errors have occurred to corrupt the outputs. Moreover, information returned from the I/O device to be sent to the RVMs may also be replicated using the comparison logic 230 in order to ensure both RVMs receive identical data, thereby, maintaining consistency between the RVMs. Similarly, the results produced by the operation being performed on the RVMs may be compared to ensure that no soft errors have occurred in the performance of these operations or in the result data itself.

In one embodiment, if the result of the comparison indicates that output data is not the same, error correction logic or software or both can be invoked to handle and recover from the errors. For example, in one embodiment a software handler is invoked in response to an error being detected, which can then either prevent the error from placing processing hardware in an incorrect state or, if the hardware has already been placed in an incorrect state, place the hardware in a correct or known state. After the handler has recovered from the soft error, in one embodiment, the operation in which the soft error occurred may be performed again.

In one embodiment, the I/O controller of FIG. 2 facilitates output comparison of the RVMs for PIO accesses by waiting for identical accesses to the replicated register sets before performing an I/O operation on the I/O device. In one embodiment, PIO operations may include PIO writes and/or side effect operations (if any) associated with PIO read operations.

In the case of uncached I/O reads and writes, which may be performed non-speculatively and in program order, a device register access from one RVM may be validated against the very next device access in program order from the other RVM. In order to prevent one RVM from issuing several I/O device accesses before each access can be validated, in one embodiment, the I/O device may defer responding to one RVM's access until the another RVM's access has occurred (e.g., using bus-level retry responses). If a subsequent RVM's access does not arrive within a certain time limit (programmable time limit, in one embodiment), the I/O device may respond with a bus error that can be intercepted by a VMM associated with the RVMs and processed accordingly (i.e. either by retrying further or handling the situation as an error).

In one embodiment, if the subsequent RVM's access to the I/O device does not match that of the first RVM's access, because, for example, the access is of a different type, is directed to a different register, or (in the case of writes) has a different data value, the I/O controller may also signal an error to the VMM via a bus error response and/or an interrupt.

In one embodiment, the I/O controller of FIG. 2 supports input replication for PIO accesses by returning the same value to both RVMs on corresponding accesses. For device register reads that do not have side effects, for example, or for reads where the returned value is independent of the side effect, the device may respond to an earlier RVM access if the response value is buffered so that the identical value is returned in response to the subsequent RVM access, even if the device's internal status changes in the interim. Again, if uncached I/O reads and writes are performed non-speculatively and in program order, then in one embodiment, the responses to PIO reads may be synchronous with respect to the program flow within the RVMs. Therefore, in such an embodiment, a device need not be concerned with the detailed timing of the responses.

Figure 3:
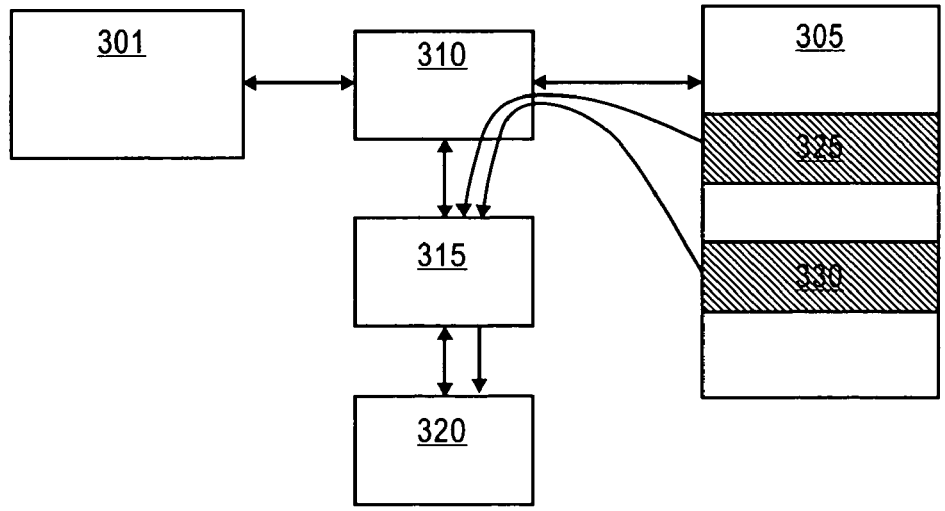
FIG. 3 illustrates a processor and an input/output (I/O) controller that may be used in conjunction with one or more embodiments of the invention.

FIG. 3 illustrates various components associated with at least one embodiment of the invention in which information is transferred to/from an I/O device via DMA transfer. In particular, FIG. 3 illustrates a CPU 301, for which two or more RVMs (not shown) may be used to represent various resources. Also illustrates in FIG. 3 is a memory 305 that may be used to store information communicated between the two or more RVMs and an I/O device 320 via memory controller 310 and I/O controller 315. Specifically, memory 305 may be a DRAM, for example, in which a buffer 325 may be designated to correspond to one of the RVMs and a buffer 330 may be designated to correspond to another RVM.

As in the example illustrated in FIG. 2, input and/or output compare logic may be included within or otherwise associated with the I/O controller 315 to compare the inputs and/or outputs corresponding to software operations being performed by the RVMs. Furthermore, I/O controller control information may be represented by two or more register sets (not shown) corresponding to the two or more RVMs, as in the example illustrated in FIG. 2. However, in the case of a DMA, as opposed to a PIO access, data written from an RVM to an I/O device or from an I/O device to an RVM are first stored in the corresponding RVM buffer (325 or 330).

In one embodiment, if DMA addresses are remapped for virtualized I/O accesses, the RVM buffers may correspond to the same physical addresses but with different I/O remapping contexts. Otherwise, in other embodiments, the buffers may reside at different physical addresses. In one embodiment, only the content of the buffers must be validated or replicated, so differences in the buffer addresses may not be important.

In one embodiment, logic within the I/O controller performs output comparison on outgoing DMA transfers (to the I/O device) by waiting until it receives a descriptor data from one of the RVMs. Descriptor data may be provided in systems in which DMA transfers are supported. The I/O controller may then compare the data buffer length and/or other parameters (e.g., disk block offset) associated with the first pair of RVM descriptor data. If the data buffer lengths and/or other parameters match, the I/O controller may then fetch the data contents from both buffers and compare them on a bit-for-bit, byte-for-byte, word-for-word (or some other granularity) basis. If the contents of both buffers match, then, in one embodiment, the I/O operation is validated and is forwarded to the device. If there is any mismatch in the operation's parameters or data, this may be indicative of a soft error, and the I/O controller may raise an interrupt to be handled by the VMM.

In one embodiment, input replication on incoming DMA transfers (from the device) may be handled in a similar fashion as output replication described above. After the data transfer is complete, in one embodiment, the data may be written to physical memory twice, at each of the locations corresponding to the RVMs.

In one embodiment, input replication may require completion notifications from the I/O controller to the CPU. If an I/O device driver is polling DMA buffers for completion, for example, the asynchronous nature of DMA transfers could cause one RVM to interpret a descriptor data to indicate that a DMA is completed while another RVM at the same logical point in its execution does not, thereby leading to a possible divergence in their execution paths.

In one embodiment, the I/O controller is prevented from writing descriptor completion flags when the RVMs are executing and there is an interrupt service routine (ISR) being executed, in order to prevent the above divergence of RVM execution paths. In one embodiment, DMA buffer transfers completed during execution of an ISR execution may not be written to their corresponding descriptors until the RVM exits the ISR. In one embodiment, the device driver may access specific device registers on entry into and exit from the ISR in order to defer descriptor updates.

Instead of writing descriptor information to a memory-based DMA descriptor field, in one embodiment, the I/O controller may signal completion of a DMA request by incrementing a counter associated with the corresponding DMA buffer in memory. In such an embodiment, completion notification may then occur via a PIO read to that register, allowing the PIO input replication technique described above to be used.

Figure 4:
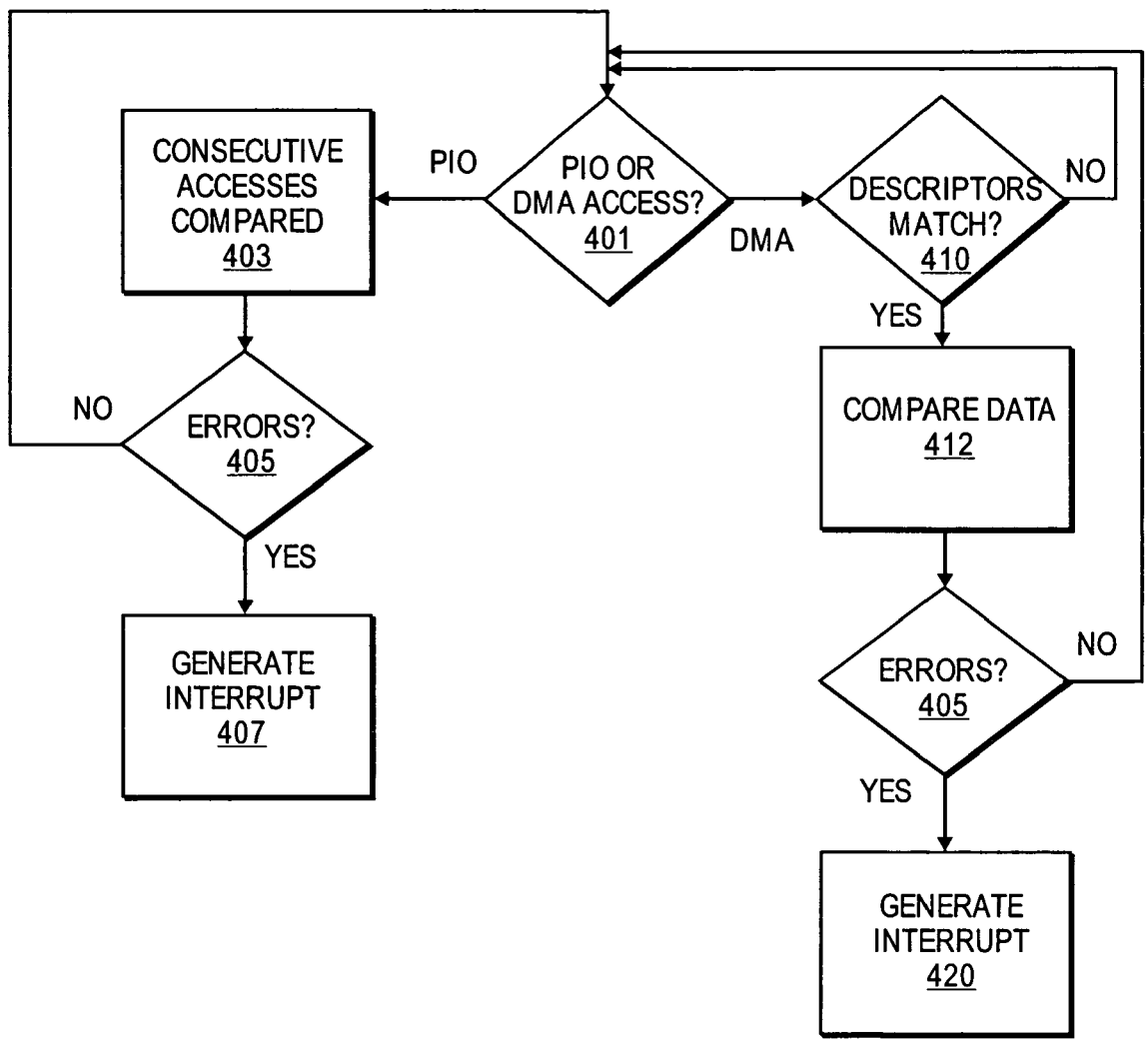
FIG. 4 is a flow diagram illustrating various operations that may be used in one or more embodiments of the invention.

FIG. 4 is a flow diagram illustrating various operations that may be used in at least one embodiment of the invention. At operation 401, it is determined whether an access (e.g., read or write) to an I/O device is a PIO access or a DMA access. If the access is a PIO access, then consecutive accesses may be presumed to be redundant accesses from two or more RVMs. Therefore, the consecutive accesses from the RVMs may be compared with each other to determine whether an error has occurred in the access at operation 403. At operation 405, if an error occurs, an interrupt may be generated and handled by a VMM corresponding to the RVMs and processed accordingly at operation 407.

If, on the other hand, the access was determined to be a DMA access, then at operation 410, a comparison is made between the descriptors associated with two or more accesses from the corresponding number of RVMs. In one embodiment, the descriptors corresponding to the accesses may consist of information, such as data buffer length, offset information, etc. If the descriptors match, then at operation 412, then the data stored in the buffers in memory corresponding to the RVMs may be compared to each other to determine whether an error occurred. If an error occurs either in the data or in the descriptors, then at operation 420 an interrupt is generated and handled by a VMM corresponding to the RVMs in an appropriate manner.

Figure 5:
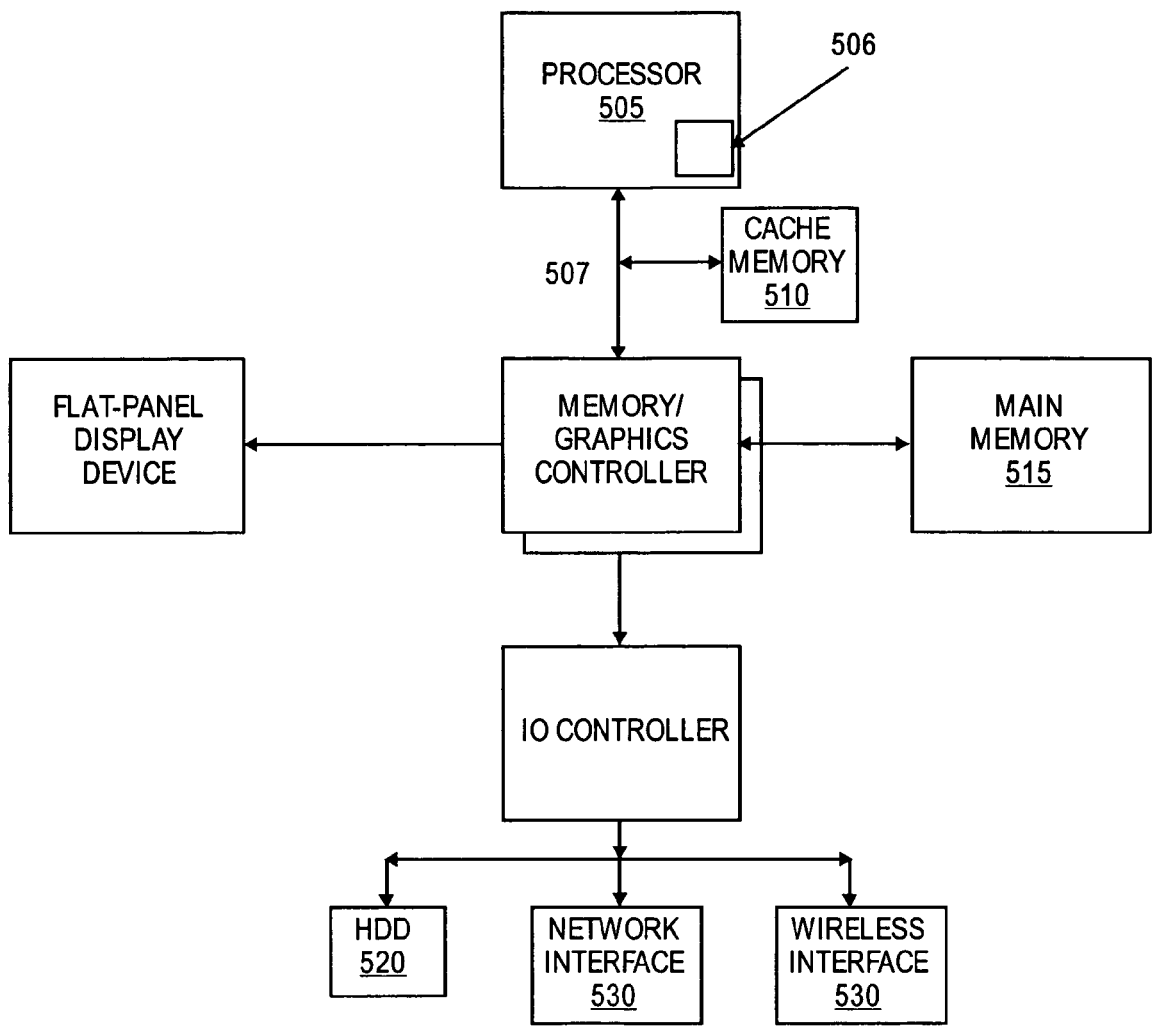
FIG. 5 is a shared-bus computer system, in which one or more embodiments of the invention may be performed.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is a storage area 506 for machine state. In one embodiment storage area may be a set of registers, whereas in other embodiments the storage area may be other memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 6:
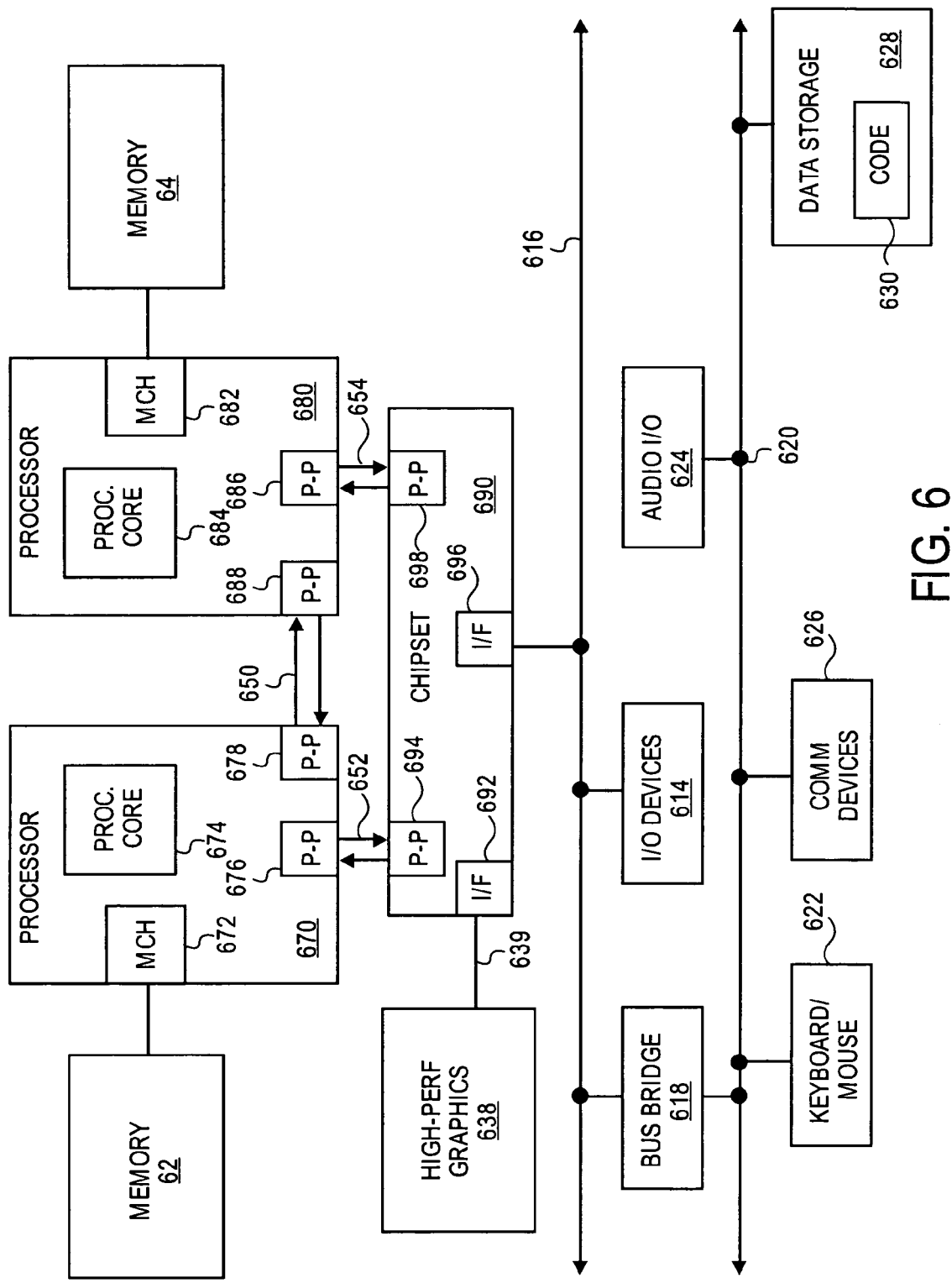
FIG. 6 is a point-to-point computer system, in which one or more embodiments of the invention may be performed.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. An apparatus comprising:
   circuitry to compare data corresponding to at least two redundant accesses with an input/output (I/O) device to determine whether an error associated with either of the at least two redundant accesses occurred.

2. The apparatus of claim 1, further comprising two or more redundant access interface storage areas to store information corresponding to the two or more redundant accesses.

3. The apparatus of claim 2, wherein the two or more redundant access interface storage areas are within an I/O controller device and are to store control information corresponding to the I/O controller device.

4. The apparatus of claim 2, wherein the two or more redundant access interface storage areas are within a memory device and are to store the data corresponding to the at least two redundant accesses.

5. The apparatus of claim 1, wherein the two or more redundant accesses are to be generated by two or more corresponding redundant virtual machines (RVMs).

6. The apparatus of claim 5, wherein if an error is detected in either of the at least two redundant accesses, an interrupt is to be generated.

7. The apparatus of claim 6, wherein the interrupt is to be received by a virtual machine manager (VMM) corresponding to the two or more RVMs.

8. A system comprising:
   a processor, at least some processing resources of which are to be represented by two or more redundant virtual machines (RVMs);
   an input/output (I/O) controller including output error detection logic to compare data corresponding to two or more accesses from the two or more RVMs.
   an I/O device to receive the two or more accesses from the two or more RVMs.

9. The system of claim 8, further including a memory to store data from the two or more accesses from the two or more accesses.

10. The system of claim 9, wherein the data from the two or more accesses are to be stored within two or more buffers within the memory, the two or more buffers corresponding to the two or more accesses.

11. The system of claim 8, wherein the I/O controller further includes input replication logic to generate two or more sets of I/O controller interface information corresponding to the two or more RVMs.

12. The system of claim 11, wherein the two or more sets of I/O controller interface information are to be stored in two or more register sets.

13. The system of claim 11, wherein the two or more accesses correspond to a programmed I/O (PIO) access.

14. The system of claim 11, wherein the two or more accesses correspond to a direct memory access (DMA).

15. The system of claim 11, wherein if an error is detected by the error detection logic, an interrupt is to be generated.

16. The system of claim 15, wherein the interrupt is to be received by a virtual machine manager (VMM) corresponding to the at least two RVMs.

17. A method comprising:
   determining whether a first access to an input/output (I/O) device corresponds to a programmed I/O (PIO) access or a direct memory access (DMA);
   comparing data from a next consecutive access with data from the first access if the first access is a PIO access and detecting whether the data from the first access and the data from the next consecutive access are equal;
   comparing descriptor information from the next consecutive access with data from the first access if the first access is a DMA.

18. The method of claim 17, further comprising generating an interrupt if the data from the first access and the data from the next consecutive access are not equal.

19. The method of claim 17, further comprising comparing the data from the next consecutive access with the data from the first access if the descriptor information from the next consecutive access matches that of the first access.

20. The method of claim 19 further comprising detecting whether the data from the first access is equal to the data from the next consecutive access if the descriptor information from the first and next consecutive accesses match.

21. The method of claim 20 further comprising comparing data from an access subsequent to the next consecutive access if the descriptor fields of the first access and the next consecutive access do not match.

22. The method of claim 21 further comprising generating an interrupt if the data from the first access and the data from either the next consecutive access or the access subsequent to the next consecutive access are not equal.

23. The method of claim 22, wherein the first access and the next consecutive access and the access subsequent to the next consecutive access are from either or two or more redundant virtual machines (RVMs).

24. The method of claim 23, further comprising generating an interrupt if the data from the first access and the data from either the next consecutive access or the data from the access subsequent to the next consecutive access are not equal.

25. A processor comprising:
   processing resources to be represented by at least two redundant virtual machines (RVMs), wherein data corresponding to accesses from the RVMs to an input/output (I/O) device are to be compared with each other by comparison circuitry to determine whether a soft error has occurred.

26. The processor of claim 25, wherein the accesses correspond to a programmed I/O (PIO) access to the I/O device.

27. The processor of claim 25, wherein the accesses correspond to direct memory access (DMA) to the I/O device.

28. The processor of claim 25, wherein the accesses are read accesses.

29. The processor of claim 25, wherein the accesses are write accesses.

30. The processor of claim 25, wherein a virtual machine manager (VMM) is to help process the soft error.

* * * * *

UNITED STATES PATENT AND TRADEMARK OFFICE
CERTIFICATE OF CORRECTION

| | | |
|---|---|---|
| PATENT NO. | : 7,587,663 B2 | Page 1 of 1 |
| APPLICATION NO. | : 11/439485 | |
| DATED | : September 8, 2009 | |
| INVENTOR(S) | : Reinhardt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twenty-first Day of September, 2010

David J. Kappos
*Director of the United States Patent and Trademark Office*